Jan. 16, 1951 R. W. JAMES ET AL 2,538,364
VALVE
Filed July 2, 1945
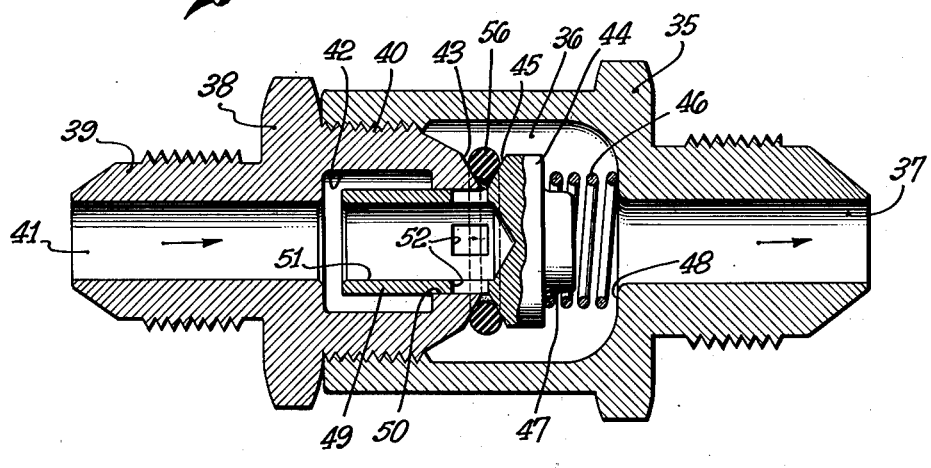
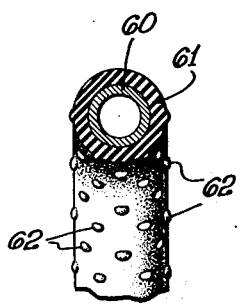
Ralph W. James,
William B. Pond,
INVENTORS
BY
ATTORNEY Patented Jan. 16, 1951

2,538,364

UNITED STATES PATENT OFFICE 2,538,364

VALVE

Ralph W. James, Pasadena, and William B. Pond, Arcadia, Calif.

Application July 2, 1945, Serial No. 602,772

4 Claims. (Cl. 251—144)

This invention relates to check valves and particularly valves which may be inserted in a fluid line.

While a great variety of check valves has been devised and used for a great many years, the common practice which has seldom been departed from is to provide a valve element which is free to shift from a seated position whenever there is no pressure applied in a reverse direction. When valves of this type are used, even though movement of the valve element may be confined to an extremely short distance, there is always the possibility that upon a reversal of pressure a slight amount of fluid may flow in a reverse direction. In order to obviate this, springs or similar resilient means have been incorporated into valves so that they tend normally to press against the valve element urging it normally against its seat from which it is moved only when pressure behind it exceeds a given amount. Valves constructed in this manner require a number of separate parts which always run the risk of wearing or breaking during use and which, when servicing is necessary, make a valve which is less easy to again place in a serviceable condition. Where a variety of loose parts is used, there is also the hazard of inferior parts being used for replacement which will fail later in service.

It is among the objects of the invention, therefore, to provide a check valve having a streamlined effect wherein the parts have been reduced substantially to a minimum.

Another object of the invention is to provide a check valve wherein the valve element is so compactly incorporated within structure in the interior of the valve that maximum flow may be permitted while at the same time keeping the valve chamber to the smallest size.

Still another object of the invention is to provide a streamlined valve in which an inherently expandable and contractable element replaces the common reciprocating variety of valve element.

A still further object of the invention is to provide a check valve for fluid lines in which the valve element changes form and size so as to conform most efficiently and advantageously to the valve seat whenever shutoff is required.

A further object still is to provide in a check valve a valve seat and valve element wherein the effective size of the aperture in the valve seat may be varied over substantially wide ranges as the call for fluid flowing through the valve is varied between corresponding wide limits without impairing the ability of the valve to seat tightly whenever it is in closed position.

With these and other objects in view, the invention consists in the construction, arrangement and combination of the various parts of the device whereby the objects contemplated are attained, as hereinafter more fully set forth, pointed out in the claims and illustrated in the accompanying drawings, in which:

Fig. 1 is a longitudinal sectional view of a form of a valve, embodying this invention.

Fig. 2 is a fragmentary view of a modified type of valve element.

Check valves for fluid lines have a wide variety of applications and in the past have been productive of a wide variety of valve devices and valve elements. Some of the different applications requiring check valves of one sort or another are, for example, valves for inner tubes, water closets, airline hose of the plug-in type, hydraulic and pneumatic lines, deicing systems, instrument lines and the like.

In providing an all-purpose check valve which will find satisfactory use in such a wide field, it is desirable to construct the valve device simply so that it may be easily fabricated, but more particularly so that once in use, moving parts will be reduced to a minimum so that no servicing problems will be presented.

In an embodiment chosen for the purpose of illustrating the invention in Fig. 1 there is shown a body portion 35 providing a chamber 36 from which an outlet passage 37 leads. Applied to the body portion 35 is a second body member 38 having a threaded inlet end 39 and an inner threaded portion 40 which engages a threaded outside end of the chamber. The body member 38 is provided with an inlet passage 41 which communicates with a bore 42. At its innermost end the inner portion is provided with a conical face 43 and opposite the conical face is a head 44 having a corresponding conical face 45. The head is held in place by action of a coiled spring 46 retained by a spring keeper 47 at one end and pressing against the adjacent end 48 of the chamber. The head is provided with a hollow, cylindrical section 49 which fits slidably within a reduced end 50 of the bore 42. Within the hollow, cylindrical section is a bore 51 and channels 52 rectangular in cross section communicate between the bore 51 and the chamber 36. An annular, resilient element 56 fits snugly between the conical faces 43 and 45 and normally forms a seal, closing the device against passage of fluid in a direction from the outlet toward the inlet.

The conical faces 43 and 45 are oppositely inclined to form outwardly diverging faces which contact the torus 56 along lines of contact upon the inner surfaces of the torus (at radial distances from the primary center smaller than the principal radius of the torus), thereby imparting an outwardly directed force to the resilient, stretchable element 56. The element 56 is separately and independently movable although it encircles the shank or tubular portion 49.

The coiled spring is so selected and positioned that it normally tends to press the head 44 in a direction from right to left, Fig. 5, thereby closing the valve.

In operation when fluid pressure at the inlet end exceeds a predetermined minimum amount, the pressure of coiled spring 46 is overcome and the head is shifted in a direction from left to right, Fig. 5. Depending upon the magnitude of the pressure, the chamber 52 will open a corresponding amount so that the greater the pressure the greater will be the opening available through the channels 52 from the bore 51 to the chamber 36. The pressure fluid at the inlet end communicating through the channels will pass outwardly around the element 56 which need not expand and which will then be free from a pressed contact against either conical face. When fluid pressure ceases at the inlet end, the coiled spring 46 will again move the head from right to left closing the passages through channels 52 and eventually moving to a position where the conical faces 43 and 45 will approach each other at the bases and press against the element 56 to effectively seal the channels against any further flow of fluid.

In the form of the valve illustrated in Fig. 1, the torus 56 need not be, but preferably is expandable or contractable circumferentially. It should be of a radius sufficient to contact both conical faces 43 and 45 with an appreciable pressure whenever the valve is closed. It is designed to have the torus sufficiently large in circumference so that when the spring 46 is pressed against the head member 44 in a direction from right to left, as viewed in Fig. 5, the conical faces will actually be pressed against the torus deforming it slightly so that the torus will seal itself against both conical faces.

The pressure at which this form of the check valve opens may be varied by regulating the strength of spring 46 as well as by varying the resiliency or elasticity of the torus 56.

In both examples of the valve structure herein shown and described, the sealing effect of the torus is designed to take place automatically as a result of differences in fluid pressure in lines connected to the valve. It will be observed that a portion of the inner surface of the torus 56 is exposed to fluid entering through the inlet port 41. This permits the valve to be operative at extremely low pressures. Moreover, since the torus is independently movable, it does not stick to either of the opposing, outwardly diverging faces 43 and 45. Moreover, since the torus is independently movable and expands whenever the movable valve element closes, there is no tendency for the torus to adhere to or stick against the opposing faces.

Particularly in the case of very large valves a torus such as the torus 56 may comprise a hollow metallic or other ring-like core 60 provided with a relatively thick outer coating 61 of resilient material, this outer coating being somewhat deformable under pressure and of sufficient thickness to assume the proper sealing when the valve is closed. To prevent too sudden a closing of the valve as a result of cessation of fluid pressure, thereby setting up a water-hammer effect, the resilient valve element may be so constructed as to gradually close. One means of effecting a gradual closing is to provide the surface of the torus, whether it be of the type shown in Fig. 2 or that shown in Fig. 1, with a series of extrusions 62, the idea being to prevent the entire sealing surface area to be closed instantaneously. The same effect might be accomplished with equal effectiveness by scoring the external surface of the torus. By use of a torus constructed in either of these manners, when the valve approaches a completely closed position, the extrusions, for example, will be the first portion of the valve element to contact the conical face and some small measure of fluid will continue to find its way between the parts separated by the height of the extrusions. As the valve continues to close the extrusions will be pressed into the space until a complete seal finally takes place. Should grooves or recesses be used they will act in much the same way, namely by providing a temporary channel of reduced capacity past the contacting surfaces which will eventually be closed due to the inherent resiliency of the material comprising the torus.

Although both forms of the valve herein disclosed show only a single torus, it is of course contemplated that a plurality of sets of opposed conical faces may be used in a single valve utilizing a plurality of tori. By this means a valve may be designed having a much greater capacity for fluid flow without it being necessary to enlarge the size of the torus so that the excessiveness of its dimensions may prevent efficient operation of the valve device.

There has thus been provided a simple and efficient check valve incorporating a valve closing element capable of deformation to accommodate itself to different open positions for the valve and which is adapted to seat tightly closing the valve immediately upon reduction of pressure of the inlet end to the amount for which the valve is set to close.

We claim:

1. In a check valve device: a body comprising an outer member having a chamber and a discharge port at one side thereof, a second member having a portion located within said chamber and having an axial bore therein having an inlet port, a head element having a shank reciprocably received within said portion, said portion and head element having opposed annular outwardly and divergently inclined faces adapted to move away from and toward each other respectively to open and closed positions, said shank having an aperture adapted to provide communication between the bore and the chamber when in open position and an annular, separately movable valve element of resilient material having an initial position between and against the inclined faces closing communication between the bore and the chamber and a series of temporary, expanded positions wherein said communication is being closed, and spring means between the outer body member and the head element biased in a direction normally adapted to move said head element to closed position.

2. In a shut-off and check valve arranged for attachment to a conduit, the combination of: an outer body portion provided with a discharge port and means for connecting the same to a conduit; a body member attachable to the outer body portion and extending thereinto, said body member including a through bore communicating with an inlet port and a rearwardly and outwardly inclined conical face adjacent the end of the bore within the outer body portion; a movable element having a tubular shank slidable within the bore of the the body member and an imperforate head at one end, the other end of said tubular shank being in communication with the inlet port, said head being provided with a forwardly and outwardly inclined conical face opposing the first-named conical face; spaced, radially extending ports formed in the tubular shank of the movable element; an independently movable, substantially impervious, resilient, elastic torus encircling the tubular portion and arranged to contact said opposing conical faces and thus close flow through said radial ports when the conical faces are in close proximity; and spring means for biasing the movable element toward the body member.

3. A valve of the character stated in claim 2 wherein the independently movable torus is a hollow ring provided with an adherent, resilient, outer surface coating.

4. A valve of the character stated in claim 2 wherein the tubular shank is provided with a plurality of circumferentially spaced, radially extending longitudinal ports.

RALPH W. JAMES.
WILLIAM B. POND.

REFERENCES CITED

The following references are of record in the file of this patent:

UNITED STATES PATENTS

| Number | Name | Date |
|---|---|---|
| 671,717 | Blake | Apr. 9, 1901 |
| 1,146,247 | Grisenthwaite | July 13, 1915 |
| 1,366,151 | Astrom | Jan. 18, 1921 |
| 1,661,886 | Eisenhauer | Mar. 6, 1928 |
| 1,793,850 | Halstead et al. | Feb. 24, 1931 |
| 2,179,292 | Hanna | Nov. 7, 1939 |
| 2,206,356 | Hutchings | July 2, 1940 |

FOREIGN PATENTS

| Number | Country | Date |
|---|---|---|
| 94,011 | Switzerland | of 1922 |